United States Patent [19]

Ziu

[11] Patent Number: 5,152,635
[45] Date of Patent: Oct. 6, 1992

[54] UNDERGROUND CONTAINMENT TANK WITH REMOVABLE PIPING ASSEMBLY

[75] Inventor: Christopher G. Ziu, Somerville, Mass.

[73] Assignee: Double Containment Systems, Monroe, Conn.

[21] Appl. No.: 755,682

[22] Filed: Sep. 6, 1991

[51] Int. Cl.[5] .............................................. F16L 1/028
[52] U.S. Cl. ...................................... 405/52; 405/154
[58] Field of Search ................... 405/52, 36, 128, 154, 405/184; 285/121, 128

[56] References Cited

U.S. PATENT DOCUMENTS

| | | | |
|---|---|---|---|
| 1,104,395 | 7/1914 | Vibber . | |
| 3,039,275 | 6/1962 | Lacaze et al. | 62/45 |
| 3,156,490 | 11/1964 | Myll | 285/121 |
| 3,626,823 | 12/1971 | Toth | 405/36 X |
| 3,698,194 | 10/1972 | Flynn | 405/36 |
| 4,971,477 | 11/1990 | Webb et al. | 405/154 |
| 5,030,033 | 7/1991 | Heintzelman et al. | 405/52 X |

*Primary Examiner*—David H. Corbin
*Attorney, Agent, or Firm*—Kramer, Brufsky & Cifelli

[57] ABSTRACT

An underground double containment system consists of a concrete outer containment receptacle housing a primary fluid flow pipe which extends therethrough and is supported on inverted T-beam structures within the concrete receptacle. The concrete receptacle can be provided with a removable cover providing access to the primary piping in modular sections defined by the boundary of the receptacle and flexible curved tubes opening in the wall of the receptacle through which the primary piping module sections can be removed from the receptacle or held for repair/maintenance.

11 Claims, 1 Drawing Sheet

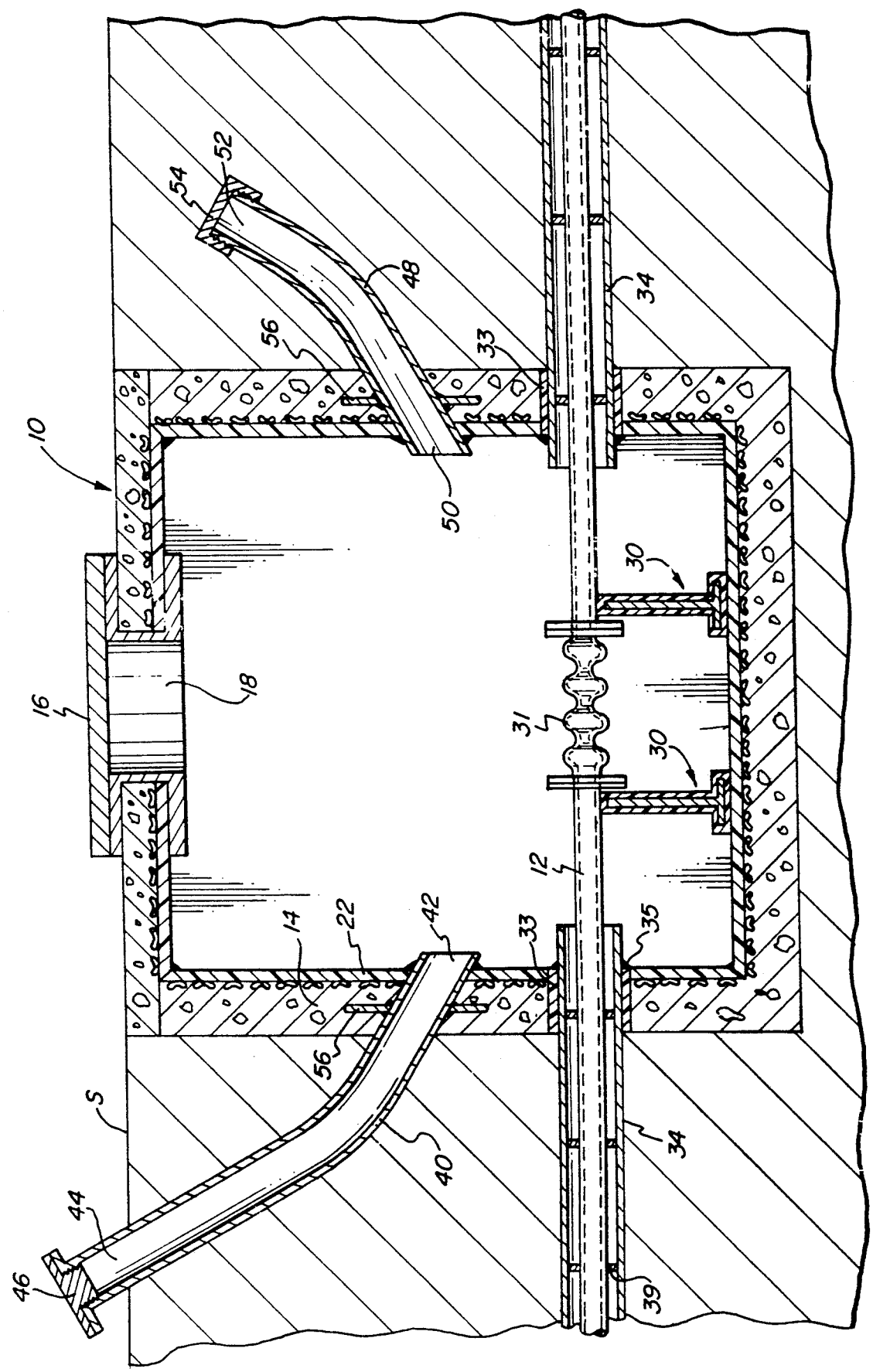

UNDERGROUND CONTAINMENT TANK WITH REMOVABLE PIPING ASSEMBLY

BACKGROUND OF THE INVENTION

1. Field of the Invention

This invention relates to an underground, contained pipe assembly, the components of which are readily removable after installation for repair and maintenance.

2. Description of the Prior Art

Underground tank systems are defined as any system that has 10% or more of its overall volume underground, including associated piping. Such systems are regulated by legislation which require the use of secondary containment with interstitial monitoring for systems that contain or transport hazardous chemicals or substances. The provision of secondary containment is optional for systems that carry or transport oil, gasoline or other petroleum based products, but in any case, the use of corrosion resistant materials is mandatory for new systems. The concept of double containment piping provides the additional degree of safety for pipes that are designed to transport hazardous, toxic or extremely corrosive chemicals. There have been many products developed to date, but the products that have been developed have not completely addressed some of the unique problems that arise when a tank or pipe is placed within another tank or pipe.

One such problem is the ease of maintaining, modifying or repairing such systems. To date, most underground storage tank double wall systems have been installed without having an ability to have ready access to the systems in the event of an upset condition. Therefore, if a repair or modification is to be made, the original system manufacturer/contractor must be called in to facilitate the repair. In many designs, a repair of a certain section would not be feasible or even possible due to the location of the system with respect to adjacent equipment or building parts. In any case, the fact that a tank and/or piping system is directly buried results in an expensive excavation in the event of a repair. What would be very helpful to most facility owners is the ability to have a system that is readily accessible. A system capable of being readily accessible would give the facility engineer the ability to have the tank or pipe section requiring modification or repair capable of being modified without a major excavation and disruption to the business. In some instances, a faulty tank or pipe section could be sent to a shop for repair, and then readily placed back into service.

SUMMARY OF THE INVENTION

In accordance with the invention, a concrete containment tank and associated outer containment piping system is constructed in modular sections with the containment piping sections joined inside of the lined concrete containment tank. The secondary containment system for the section of primary piping within the tank can consist solely of the tank. Ready access to the interior of the tank and its connections is provided through a removable cover or manhole. A bendable primary pipe, through which fluid flows, is supported for longitudinal movement due to thermal expansion within the interior of the concrete containment tank.

Exteriorly of the tank, the double containment system is formed in straight sections and comprises the primary piping enclosed within a spaced, outer or double containment pipe. All of the double containment pipes are terminated inside of the lined-concrete tanks or housings. The tanks are designed to allow straight lengths of primary piping between consecutive tank locations.

The primary piping may be extracted, removed and reinserted through a flexible pipe opening in one wall of the tank at one end and above ground at its other end or the piping may be passed into a below ground pipe if the repair can be achieved in the tank. The only criteria is that the straight sections of primary piping or the length of the tank would have to be long enough in order that the bending radius of the primary piping is not exceeded during the extraction, removal and reinsertion processes.

BRIEF DESCRIPTION OF THE DRAWING

Further objects and advantages of the invention will become more apparent from the following description and claims, and from the accompanying drawing, wherein:

The sole FIGURE is a cross-sectional view of the underground containment tank and removable primary piping assembly comprising the subject matter of the present invention.

DETAILED DESCRIPTION OF THE PREFERRED EMBODIMENT

Referring now to the drawing in detail, the invention consists of a double containment piping and tank system generally indicated at 10.

The system 10 includes a metallic, fiber reinforced, bendable thermosetting plastic or thermoplastic inner piping 12 through which the primary fluid conveyed by the system flows. Piping 12 is contained and housed within a thermoplastic-lined concrete encasement or tank 14 provided with a cover 16 which is removable, permitting access to the interior of tank 14. Upon removal of the cover 16, access to the primary piping 12 for repair or maintenance as required, is attained through manhole access port 18.

The encasement or tank 14 and cover 16 is lined with a thermoplastic liner 22 which is accomplished with the use of specially produced thermoplastic studded sheets described in detail in my copending application Ser. No. 07/719,840 filed June 24, 1991 and assigned to the same assignee as the present application, which disclosure is incorporated herein. Portions of the thermoplastic sheets 24 can be joined together, where needed, along a sinusoidal mechanical lock seam to prevent moisture penetration of the encasement or tank 14 and cover 16. Penetrations through the lined concrete of the encasement or tank 14 and cover 16, as needed, can be accomplished with the use of a mechanical seal (such as Link-Seal by Thunderline Corporation of Minnesota), by the use of water stops that are welded to the pipe and embedded in the concrete, by the use of welding the pipes directly to the sheet lining, or any combination of these.

The lined concrete encasement or tank 14 is also manufactured with a plurality of spaced plastic-coated steel support sections 30 having an inverted T-beam configuration. The supports 30 are embedded into the concrete wall of tank 14 or welded to the liner 22 if the T-beam coating is compatible. The support structures 30 support the primary piping 12.

An outer containment pipe 34 outside of the access tank 14 may also be embedded in the encasement or tank concrete or secured to a compatible material sleeve 33 in the wall of tank 14 and welded to liner 22 inside of tank 14, if compatible with the tank, as shown at 35. Inner piping 12 and outer piping 34 terminating at tank 14 may be formed from different materials since they are not joined to each other directly but only through the concrete encasement or tank 14. The inner piping 12 is spaced from the walls of center piping 34 by spacers 39. An expansion pipe joint fitting 31 may be used to form the ends of the straight sections of primary piping 12 within tank 14, to accommodate expansion and construction of the piping 12 due to changing thermal conditions. Instead of having the space between pipe 34 and pipe 12 open, a termination fitting (not shown) with an "O" ring gland seal may be inserted across the open space between the end of each pipe 34 and the outer diameter of pipe 12 to close the same and prevent leakage in tank 14 from the interior of the containment pipe 34.

The primary piping 12 may be extracted, removed and reinserted through a flexible curved pipe 40 opening at 42 in one wall of tank 14 at one end and above ground surface S at its other end 44 provided with a threaded plug-type cap 46 to normally close the same. The piping 12 to be repaired may be passed through opening 42, bent, and removed through opening 44 above ground. It may be reinserted in a like manner. The section of primary piping 12 removed or the length of the tank 14 would have to be long enough in order that the bending radius of the primary piping is not exceeded during the extraction, removal or reinsertion processes. Alternatively, the repair may be done in the tank 14 and the end of the piping 12 inserted in a tube or second flexible curved pipe 48 having an open end 50 in one wall of tank 14 and a second capped end 52 provided with a threaded cap 54 below ground surface S. Flexible curved pipe 48 allows the piping to be completely extracted or at least a minimum excavation would have to be performed above opening 52. It would still be less than what would be required if an entire straight section of pipe would have to be excavated.

A water stop or barrier 56 may be secured to each pipe 40,48 and embedded in the adjacent wall of tank 14. The ends 42,50 of the pipes may be welded, if compatible to the liner 22. If necessary, when reinserting or removing the piping 12 for installation in the system, the piping may be inserted first through one pipe and then the other to obtain access to an appropriate end within tank 14 which can be reattached to another straight section or removed through the above ground tube, as required. The pipes or tubes 40,48 may both have openings above ground surface S or below, depending on the characteristics and length of piping sections 12.

What is claimed is:

1. A double containment assembly for a fluid carrying pipe comprising:
    a primary pipe adapted to conduct a fluid through the assembly;
    a concrete receptacle having a cover housing said primary pipe and adapted to be inserted below ground surface;
    a containment pipe surrounding at least a portion of said primary pipe and coupled to said receptacle;
    means within said concrete receptacle for supporting said primary pipe;
    said concrete receptacle including,
    a plastic liner precluding the penetration of moisture through said concrete into the interior of said receptacle; and
    at least one curved tube having an end opening in the wall of said lined concrete receptacle and directed upward toward the surface of the ground for receiving a section of said primary piping extending into said concrete receptacle in an area generally opposite said at least one curved tube removed for repair.

2. The double containment assembly of claim 1 wherein said curved tube has a second end terminating above the ground surface.

3. The double containment assembly of claim 1 wherein said curved tube has a second end terminating below the ground surface.

4. The double containment assembly of claim 1, wherein:
    said containment pipe is concentrically mounted with respect to said primary pipe on at least one side of said concrete receptacle and terminates within the interior of said concrete receptacle and is fixed to said concrete receptacle.

5. The double containment assembly of claim 1 wherein means are provided for closing the second end of said curved tube.

6. A double containment pipe assembly comprising:
    a receptacle for installation at least partially below ground, and defining an opening and including a cover over the open for removing the cover to access the interior of the receptacle;
    a containment pipe coupled to the receptacle;
    a primary pipe received within the containment pipe and extending into the receptacle; and
    at least on curved tube member coupled on one end to the receptacle and located generally opposite the area where the primary pipe extends into the receptacle and directed upward toward the surface of the ground for facilitating insertion of the primary pipe into the curved tube member for removal or repair of the primary pipe.

7. A double containment pipe assembly as defined in claim 6, including tow sections of primary pipe extending into the receptacle and coupled to each other within the receptacle, and two curved tube members coupled to the receptacle, each curved tue member being located generally opposite the area where a respective section of primary pipe extends into the receptacle for facilitating insertion of the respective section of primary pipe into the curved tube member for removal or repair of the section of primary pipe.

8. A double containment pipe assembly as defined in claim 6, wherein the other end of the curved tube is located below ground.

9. A double containment pipe assembly as defined in claim 6, wherein the other end of the curved tube is located above ground.

10. A double containment pipe assembly as defined in claim 6, further comprising at least one cap member coupled to the other end of the curved tube member for closing the end of the tube member.

11. A double containment pipe assembly as defined in claim 6, wherein the receptacle is made of concrete and includes a plastic liner for preventing the penetration of moisture into the receptacle.

* * * * *

UNITED STATES PATENT AND TRADEMARK OFFICE
CERTIFICATE OF CORRECTION

PATENT NO. : 5,152,635
DATED : October 6, 1992
INVENTOR(S) : Christopher G. Ziu

It is certified that error appears in the above-identified patent and that said Letters Patent is hereby corrected as shown below:

Column 4, line 30, "open" should read -- opening --; and line 35, after "at least", "on" should read -- one --.

Column 4, line 43, "tow" should read -- two --; and line 46, "tue" should read -- tube --.

Signed and Sealed this

Twelfth Day of October, 1993

Attest:

BRUCE LEHMAN

Attesting Officer

Commissioner of Patents and Trademarks